(12) United States Patent
Igarashi et al.

(10) Patent No.: US 7,738,481 B2
(45) Date of Patent: Jun. 15, 2010

(54) WIRELESS COMMUNICATION DEVICE AND WIRELESS COMMUNICATION METHOD

(75) Inventors: Kei Igarashi, Yokosuka (JP); Akira Yamada, Yokohama (JP); Atsushi Fujiwara, Yokohama (JP); Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 616 days.

(21) Appl. No.: 11/671,280

(22) Filed: Feb. 5, 2007

(65) Prior Publication Data

US 2007/0183326 A1    Aug. 9, 2007

(30) Foreign Application Priority Data

Feb. 8, 2006   (JP)   .............................. 2006-031395

(51) Int. Cl.
   *H04L 12/413*   (2006.01)
(52) U.S. Cl. .................... 370/448; 370/349; 370/395.4; 370/395.42; 370/445
(58) Field of Classification Search .................. 370/350, 370/338, 445, 448, 349, 395.43, 395.42
See application file for complete search history.

(56) References Cited

U.S. PATENT DOCUMENTS

| | | | | |
|---|---|---|---|---|
| 7,280,517 | B2 * | 10/2007 | Benveniste | .................. 370/338 |
| 7,477,621 | B1 * | 1/2009 | Loc et al. | .................... 370/329 |
| 2003/0087645 | A1 * | 5/2003 | Kim et al. | .................... 455/453 |
| 2005/0089002 | A1 * | 4/2005 | Shin et al. | .................... 370/338 |
| 2005/0163150 | A1 * | 7/2005 | Yang et al. | .................. 370/445 |
| 2008/0013522 | A1 * | 1/2008 | Benveniste | .................. 370/350 |

FOREIGN PATENT DOCUMENTS

EP   1 557 992 A2   7/2005
JP   2005-12725   1/2005
JP   2006-14275   1/2005

(Continued)

OTHER PUBLICATIONS

"Part 11: Wireless LAN Medium Access Control (MAC) and Physical Layer (PHY) Specifications", ANSI/IEEE Std 802.11, 1999 Edition (R2003), (528 pages).

(Continued)

*Primary Examiner*—Jean A Gelin
*Assistant Examiner*—Mong-Thuy Tran
(74) *Attorney, Agent, or Firm*—Oblon, Spivak, McClelland, Maier & Neustadt, L.L.P.

(57) ABSTRACT

A wireless communication device that performs packet transmission in accordance with a packet transmission system that performs wireless bandwidth allocation by virtual carrier sensing has a time-point management section that manages the time-point and outputs current time-point information, and a parameter management section that manages a parameter relating to packet transmission right acquisition priority. The parameter management section includes: a parameter holding section that holds, in association with a time-point, a parameter relating to packet transmission right acquisition priority that changes with a different distribution between wireless communication devices located in the same wireless LAN area, in a prescribed period; and a parameter alteration section that reads, from the parameter holding section, the parameter associated with current time-point information and dynamically alters a current parameter relating to packet transmission right acquisition priority in accordance with the parameter thus read.

11 Claims, 15 Drawing Sheets

FOREIGN PATENT DOCUMENTS

JP   2005-184522   7/2005
WO   WO 03/085891 A1   10/2003

OTHER PUBLICATIONS

"Part 11: Wireless LAN Medium Access Control (MAC) and Physical Layer (PHY) Specifications: Amendment: Medium Access Control (MAC) Quality of Service (QoS) Enhancements", IEEE P802.11e/D13.0, Jan. 2005, pp. 73-92.

LAN/Man Committee, "Local and Metropolitan Area Networks—Specific Requirements", URL: http://standards.ieee.org/reading/ieee/std/lanman/restricted/802.11e-2005.pdf>, XP002429954, 2005, pp. 1-189.

\* cited by examiner

*Fig.12*

(a) VALUES OF IFS AND CWmin OF TERMINAL A IN A GIVEN PERIOD

| TIME-POINT | 0ms-2.5ms | 2.5ms-40ms |
|---|---|---|
| PARAMETERS | IFS=10 $\mu$s, CWmin=3 | IFS=40 $\mu$s, CWmin=15 |

(b) VALUES OF IFS AND CWmin OF TERMINAL B IN A GIVEN PERIOD

| TIME-POINT | 1.3ms-3.8ms | 0ms-1.3ms, 3.8ms-40ms |
|---|---|---|
| PARAMETERS | IFS=10 $\mu$s, CWmin=3 | IFS=40 $\mu$s, CWmin=15 |

(c) VALUES OF IFS AND CWmin OF TERMINAL C IN A GIVEN PERIOD

| TIME-POINT | 2.6ms-5.1ms | 0ms-2.6ms, 5.1ms-40ms |
|---|---|---|
| PARAMETERS | IFS=10 $\mu$s, CWmin=3 | IFS=40 $\mu$s, CWmin=15 |

(d) VALUES OF IFS AND CWmin OF TERMINAL D IN A GIVEN PERIOD

| TIME-POINT | 0ms-40ms |
|---|---|
| PARAMETERS | IFS=50 $\mu$s, CWmin=31 |

Fig. 13

(a) VALUES OF IFS AND CWmin OF TERMINAL A IN A GIVEN PERIOD, WHEN THE TRANSMISSION WAITING TIME PARAMETER THAT IS ONCE SET TO A SMALL VALUE IS HELD IN THE PRESCRIBED PERIOD

| TIME-POINT | 0ms-40ms |
|---|---|
| PARAMETERS | IFS=10 μs, CWmin=3 |

(b) VALUES OF IFS AND CWmin OF TERMINAL B IN A GIVEN PERIOD, WHEN THE TRANSMISSION WAITING TIME PARAMETER THAT IS ONCE SET TO A SMALL VALUE IS HELD IN THE PRESCRIBED PERIOD

| TIME-POINT | 0ms-1.3ms | 1.3ms-40ms |
|---|---|---|
| PARAMETERS | IFS=40 μs, CWmin=15 | IFS=10 μs, CWmin=3 |

(c) VALUES OF IFS AND CWmin OF TERMINAL C IN A GIVEN PERIOD, WHEN THE TRANSMISSION WAITING TIME PARAMETER THAT IS ONCE SET TO A SMALL VALUE IS HELD IN THE PRESCRIBED PERIOD

| TIME-POINT | 0ms-2.6ms | 2.6ms-40ms |
|---|---|---|
| PARAMETERS | IFS=40 μs, CWmin=15 | IFS=10 μs, CWmin=3 |

Fig. 14

VALUES OF IFS AND CWmin OF TERMINAL A IN A GIVEN PERIOD, WHEN A RAMP FUNCTION IS EMPLOYED FOR THE PRIORITY PERIOD DISTRIBUTION

| TIME-POINT | 0ms–0.5ms | 0.5ms–1.0ms | 1.0ms–1.5ms | 1.5ms–2.0ms | 2.0ms–2.5ms | 2.5ms–40ms |
|---|---|---|---|---|---|---|
| PARAMETERS | IFS=34 μs<br>CWmin=13 | IFS=28 μs<br>CWmin=9 | IFS=22 μs<br>CWmin=7 | IFS=16 μs<br>CWmin=5 | IFS=10 μs<br>CWmin=3 | IFS=40 μs<br>CWmin=15 |

Fig. 15

VALUES OF IFS AND CWmin OF TERMINAL A WHEN,
DUE TO A DROP IN TRANSMISSION RATE ANOTHER TERMINAL
BECOMES INCAPABLE OF ACQUIRING A TRANSMISSION RIGHT
WITHIN THE TRANSMISSION RIGHT ACQUISITION PRIORITY PERIOD

| TIME-POINT | 3.9ms-6.4ms | 0ms-3.9ms, 6.4ms-40ms |
|---|---|---|
| PARAMETERS | IFS=10 μs, CWmin=3 | IFS=40 μs, CWmin=15 |

WIRELESS COMMUNICATION DEVICE AND WIRELESS COMMUNICATION METHOD

BACKGROUND OF THE INVENTION

1. Field of the Invention

The present invention relates to a wireless communication device and wireless communication method whereby communication priority control is executed in a wireless LAN communication system, in particular a CSMA/CA (carrier sense multiple access with collision avoidance) system.

2. Related Background Art

In a CSMA/CA system, a terminal performs virtual carrier sensing for a random time prior to transmission to confirm that no other terminal is in communication with the base station; if another terminal is in communication with the base station, the terminal waits until this communication has been completed, and performs actual packet transmission. With this system, all terminals have equal transmission rights. "Virtual carrier sensing" means that, after the channel has been idle for a time called the IFS (Inter Frame Space), a random number is generated within a prescribed range called the CW (Contention Window) and a random time is determined based on this random number and back-off control is performed as described below within this random time. Back-off control means that control is performed wherein a calculated random number value is used as an initial value, this value is diminished with lapse of time, and actual packet transmission is performed when the value has reached 0. The IFS is prescribed in accordance with wireless LAN standard IEEE802.11, and is a fixed time for which idle detection should be performed prior to transmission; the CW is the maximum value that can be taken by the random number used in back-off: these are necessary parameters for implementation of user multiplexing. According to IEEE802.11, the minimum value CWmin and the maximum value CWmax are prescribed, and for back-off in the initial transmission a random value is calculated using the value of CWmin, and back-off is performed with the CW that is doubled every time retransmission is attempted: the value CWmax is the maximum value of CW. Communication with a plurality of terminals sharing the same channel is possible by such back-off in accordance with a random function. However, it should be noted that, with this system, there is a possibility that packet transmission may be performed by a plurality of terminals simultaneously: in this case, packet collision will occur, and packets will not be correctly received, resulting in degradation of communication quality.

A prior art technique relating to priority control in such a communication system is EDCA (Enhanced Distributed Channel Access) as specified in IEEE802.11e indicated in "ANSI/IEEE std 802.11, wireless LAN medium access control (MAC) and physical layer (PHY) specifications, 1999" (hereinafter called Document 1). In this technique, priority of four different types is assigned to the packets, and a prioritized packet transmission right is conferred on packets of high priority by shortening the transmission waiting times such as IFS, CWmin, or CWmax referred to above. In this way, relative priority control can be achieved in a communication environment in which applications of various types such as voice and data are present together. In HCCA (HCF controlled channel access), which is defined in IEEE802.11e likewise described in the above Document 1, a polling frame containing channel use opportunity (TXOP) information is transmitted to a wireless communication device by a base station, and if a terminal receives such a polling frame, the terminal obtains priority rights without being subjected to back-off.

In an improvement to the prior art technology, for example as described in Japanese Patent Application Laid-open Gazette No. 2005-12725 (hereinafter called Document 2), the base station communicates a parameter, relating to transmission waiting time, that is dependent on the amount of traffic in the entire cell, to all of the terminals, and every time the terminals perform transmission, the probability of packet collision is controlled by performing transmission in accordance with this parameter, in order to obtain smooth communication. Also, in Japanese Patent Application Laid-open Gazette No. 2005-184522 (hereinafter called Document 3), smooth communication by all of the terminals is achieved by arranging to perform transmission solely at a "transmission allowed time-point" that is allocated within a prescribed time period that is repeated periodically.

SUMMARY OF THE INVENTION

However, the prior art technique EDCA is merely a technique of conferring relative order of transmission priority of packets having different priorities, and is not a technique that contributes to guaranteeing quality or conferring priority between terminals that transmit packets having the same priority. It is therefore not possible to lower the likelihood of packet collision caused by simultaneous transmission of packets of the same priority by a plurality of terminals. If packet collision occurs, even if retransmission is successful, delay takes place, and if retransmission fails, packet loss occurs. Furthermore, when back-off is performed by a plurality of terminals in order to acquire packet transmission right, a transmission waiting time i.e. delay is generated in order for a terminal whose transmission right has been taken by another terminal to acquire a transmission right again. The probability of occurrence of such problems increases as the number of terminals increases. The delays and packet loss caused by such problems cause serious degradation of quality in the case in particular of real-time applications typified by VoIP (Voice over Internet Protocol).

In contrast, in the case of HCCA, a channel use time is conferred on each terminal by transmitting a polling frame thereto and this makes it possible to guarantee quality; however, no specific method of schedule design has been specified and no way of coping with expansion of the time for exchanging signals in response to lowering of transmission rate resulting from retransmission timing or link adaptation has been described. Furthermore, in the case of HCCA, if a cell using the same frequency or an adjacent frequency is present in the vicinity, inefficient bandwidth utilization occurs in the region of cell overlap, and there is collision of the polling transmitted by the base stations. In particular in the case of applications such as VoIP that require periodic packet transmission, once polling collision occurs, collisions occur consecutively, and this causes severe degradation of quality.

Furthermore, although, in the above Document 2, the parameter relating to transmission waiting time is dynamically altered in response to the amount of traffic in the entire cell, a prioritized transmission timing is not conferred on each terminal, so the problem is not solved. Also, although, in the case of Document 3 described above, a transmission allowed time-point is set for each terminal, just as in the case of HCCA, no specific method of schedule design is prescribed and no means of solution are indicated for the case where retransmission is necessary or for the case where lowering of the transmission rate results in fluctuation of the time occupied by transmission and reception, or where transmission has become impossible due to the bandwidth of the home base station being busy at the transmission allowed time-point, because of transmission at an unregulated time-point by some terminal in which the technology of Document 3 has not been implemented.

The present invention is made in order to solve the problems described above. The object of the present invention is to provide a wireless communication device and wireless communication method whereby the transmission and reception timing can be suitably adapted in a communication environment in which a plurality of terminals that require periodic transmission of packets as in the case of VoIP are present in a single cell.

A wireless communication device according to the present invention is a wireless communication device that performs packet transmission in accordance with a packet transmission system, comprising: time-point management module that manages the time-point and outputs current time-point information; and parameter management module that manages a parameter relating to packet transmission right acquisition priority, wherein the parameter management module comprises: parameter holding module that holds, in association with a time-point, a parameter relating to packet transmission right acquisition priority that changes with a different distribution between wireless communication devices located in the same wireless LAN area, in a prescribed period; and parameter alteration module that reads, from the parameter holding module, the parameter associated with current time-point information that is output by the time-point management module and dynamically alters a current parameter relating to packet transmission right acquisition priority in accordance with the parameter thus read. In this way, when a plurality of wireless communication devices hold packets to be transmitted, the packets that are held by the wireless communication devices come to be transmitted with different timings from other wireless communication devices, so smooth communication becomes possible in which the likelihood of packet collision is decreased.

Preferably also a wireless communication device according to the present invention further comprises: transmission rate control module that manages the transmission rate used by this wireless communication device itself and outputs maximum transfer rate information; and channel occupation time calculation module that calculates the channel occupation time corresponding to the time required for packet transmission and reception, based on the maximum transmission rate information that is output by the transmission rate control module and transmission packet size, and the parameter management module sets a packet transmission right acquisition priority time of this wireless communication device itself to a value longer than the channel occupation time calculated by the channel occupation time calculation module. In this way, by allowing the channel occupation time that is involved in transmission and reception by a given wireless communication device to interrupt the transmission right acquisition priority time of another wireless communication device, the likelihood of occurrence of the inconvenience that the other wireless communication device in question will fail to acquire a transmission right can be decreased, thereby making possible smooth communication.

Preferably also, in a wireless communication device according to the present invention, the parameter management module is configured to set the packet transmission right acquisition priority time of this wireless communication device itself such that the packet transmission right acquisition priority time of this wireless communication device itself partially overlaps with a packet transmission right acquisition priority time of another wireless communication device in the same wireless LAN area. In this way, it is possible to avoid inefficient utilization of a channel due to failure of one or other wireless communication device to perform transmission and reception within the transmission right priority time, and to avoid the circumstance that transmission and reception by a wireless device in which a construction according to the present invention is not implemented may interrupt a transmission right acquisition priority time that is allocated to a wireless communication device according to the present invention.

Preferably also, in a wireless communication device according to the present invention, a construction is adopted wherein the parameter management module is configured to manage the parameter by employing, as a distribution function of packet transmission right acquisition priority in the packet transmission right acquisition priority time, a function in which the maximum value of the packet transmission right acquisition priority occurs subsequent to an intermediate time-point of the packet transmission right acquisition priority time and before a termination time-point thereof. In this way, even when the channel occupation time that is involved in transmission and reception is interrupted by the transmission right acquisition priority time, the likelihood of transmission right acquisition within the transmission right acquisition priority time can be increased.

Preferably also, in a wireless communication device according to the present invention, the parameter management module is configured to manage the parameter by employing a step function as a distribution function of packet transmission right acquisition priority in the packet transmission right acquisition priority time. In this way, a function of altering the parameter relating to transmission right acquisition priority in accordance with the package generation time can easily be provided.

Preferably also, a wireless communication device according to the present invention further comprises failure management module that manages and outputs at least one of a transmission failure probability based on a transmission failure history in the packet transmission right acquisition priority time and a transmission right acquisition failure probability based on a transmission right acquisition failure history, and when at least one of the transmission failure probability and transmission right acquisition failure probability output by the failure management module is a prescribed threshold value or more, the parameter management module is configured to increase the value of the packet transmission right acquisition priority in the packet transmission right acquisition priority time or a variance of this value. In this way, smooth communication becomes possible by increasing the transmission success probability in the transmission right acquisition priority time.

Preferably also, in a wireless communication device according to the present invention, the parameter management module is configured to use a Contention Window in accordance with a prescribed distribution function in the packet transmission right acquisition priority time, not only on an initial transmission, but also on re-transmitting, so long as this is within the packet transmission right acquisition priority time. In this way, transmission right acquisition can be achieved in prioritized fashion compared with other wireless communication devices in the transmission right acquisition priority time, not only on the initial transmission, but also on re-transmitting.

Preferably also, in a wireless communication device according to the present invention, the parameter management module is configured to set the packet transmission right acquisition priority time such that the packet transmission right acquisition priority time of a wireless communication device whose channel occupation time has been increased to such an extent as to impede transmission right acquisition by another wireless communication device among a plurality of wireless communication devices located within the same wireless LAN area, is last in terms of time among packet transmission right acquisition priority times of the plurality of wireless communication devices. In this way, it is possible to reduce the likelihood of occurrence of the inconvenience that, due to interruption of the transmission right priority acquisition period of another wireless communication device by the channel occupation time involved in transmission and reception by one wireless communication device, the other wireless communication device in question will fail to acquire a transmission right.

In addition, the present invention relating to a wireless communication device can be described as an invention relating to a wireless communication method, as below: this invention relating to a wireless communication method presents the same beneficial effects.

Specifically, a wireless communication method according to the present invention in a wireless communication device provided with parameter holding module that holds, in association with a time-point, a parameter relating to packet transmission right acquisition priority that changes with a different distribution between wireless communication devices located in the same wireless LAN area, in a prescribed period, is a wireless communication method for performing packet transmission in accordance with a packet transmission system that performs wireless bandwidth allocation by virtual carrier sensing. And the wireless communication method comprises: a time-point ascertaining step of ascertaining a current time-point; a parameter reading step of reading the parameter relating to packet transmission right acquisition priority associated with current time-point information, from the parameter holding module; and a parameter alteration step of dynamically altering a current parameter relating to packet transmission right acquisition priority, in accordance with the parameter thus read.

With the present invention, appropriate transmission and reception timing can be achieved in a communication environment in which a plurality of wireless communication devices requiring periodical transmission of packets such as VoIP are present in a single cell.

BRIEF DESCRIPTION OF THE DRAWINGS

FIG. 12 is a table showing the values of IFS and CWmin for VoIP terminals A to C and a data terminal D respectively.

FIG. 13 is a table showing the values of IFS and CWmin for VoIP terminals A to C respectively in the case where the transmission waiting time parameter that is once set to a small value is held for a prescribed period.

FIG. 14 is a table showing the values of IFS and CWmin of a VoIP terminal A in a period in the case where a ramp function is employed in the distribution of priority time.

FIG. 15 is a table showing the values of IFS and CWmin of a VoIP terminal A in the case where the transmission rate of the VoIP terminal A drops and another VoIP terminal becomes unable to acquire a transmission right within the transmission right acquisition priority period.

DESCRIPTION OF THE PREFERRED EMBODIMENTS

Figure 1:
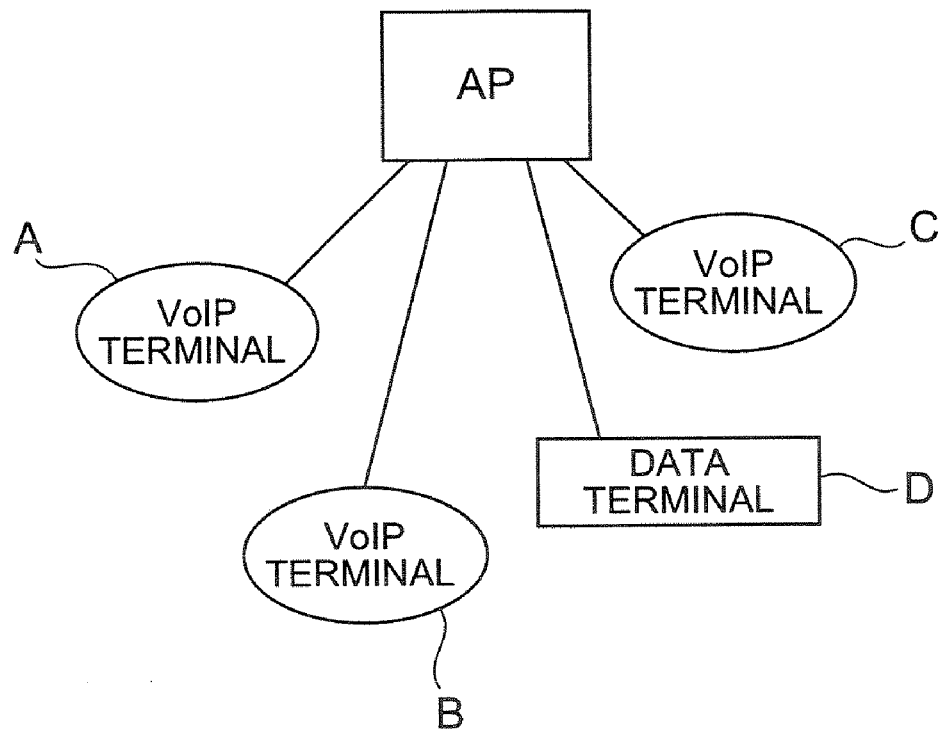
FIG. 1 is a layout diagram of a wireless LAN network according to an embodiment of the present invention.

An embodiment of the present invention is described below. FIG. 1 shows a layout diagram of a wireless LAN network according to this embodiment. As shown in this FIG. 1, the wireless LAN network comprises an AP (access point) which is the base station of the wireless LAN, VoIP terminals A, B, C equipped with control unit according to IEEE802.11b and according to the present invention, and a data terminal D in which only the IEEE802.11 standard technology is implemented. It should be noted that, in FIG. 1, for convenience in description, only four terminals are described, but any suitable number of wireless communication devices may be present.

Figure 2:
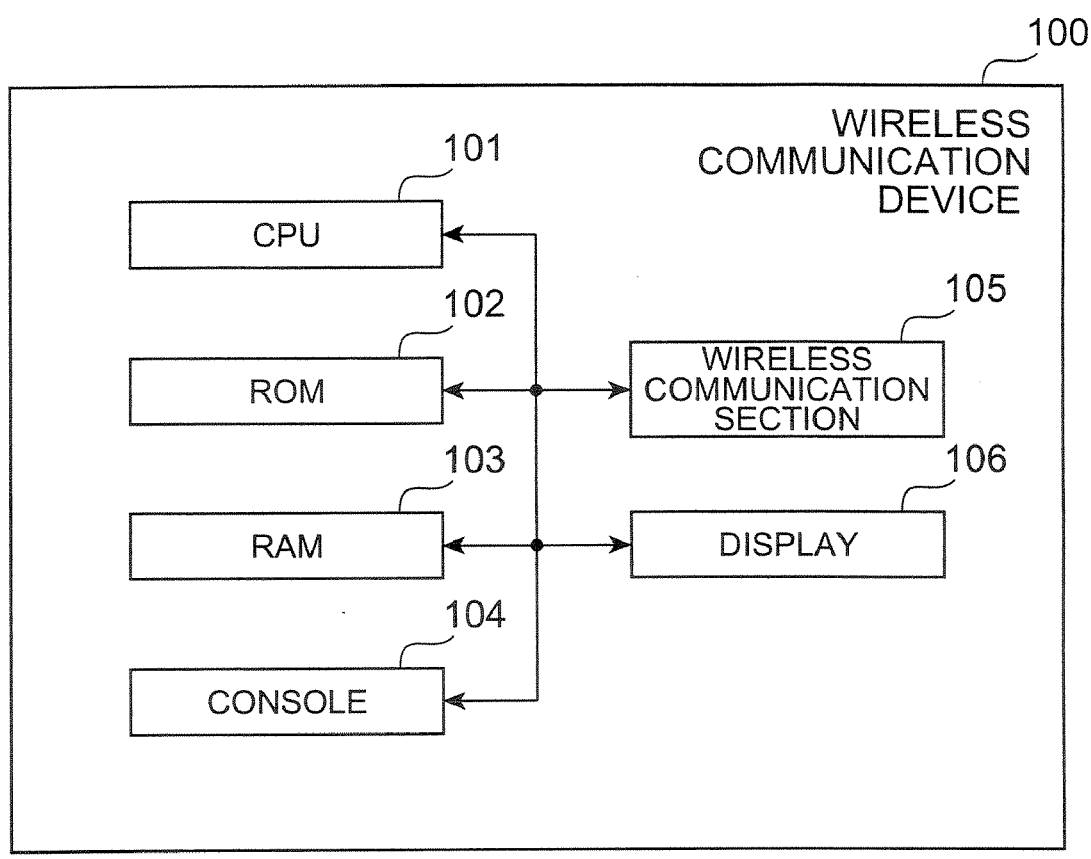
FIG. 2 is a hardware layout diagram of a wireless communication device.
Figure 3:
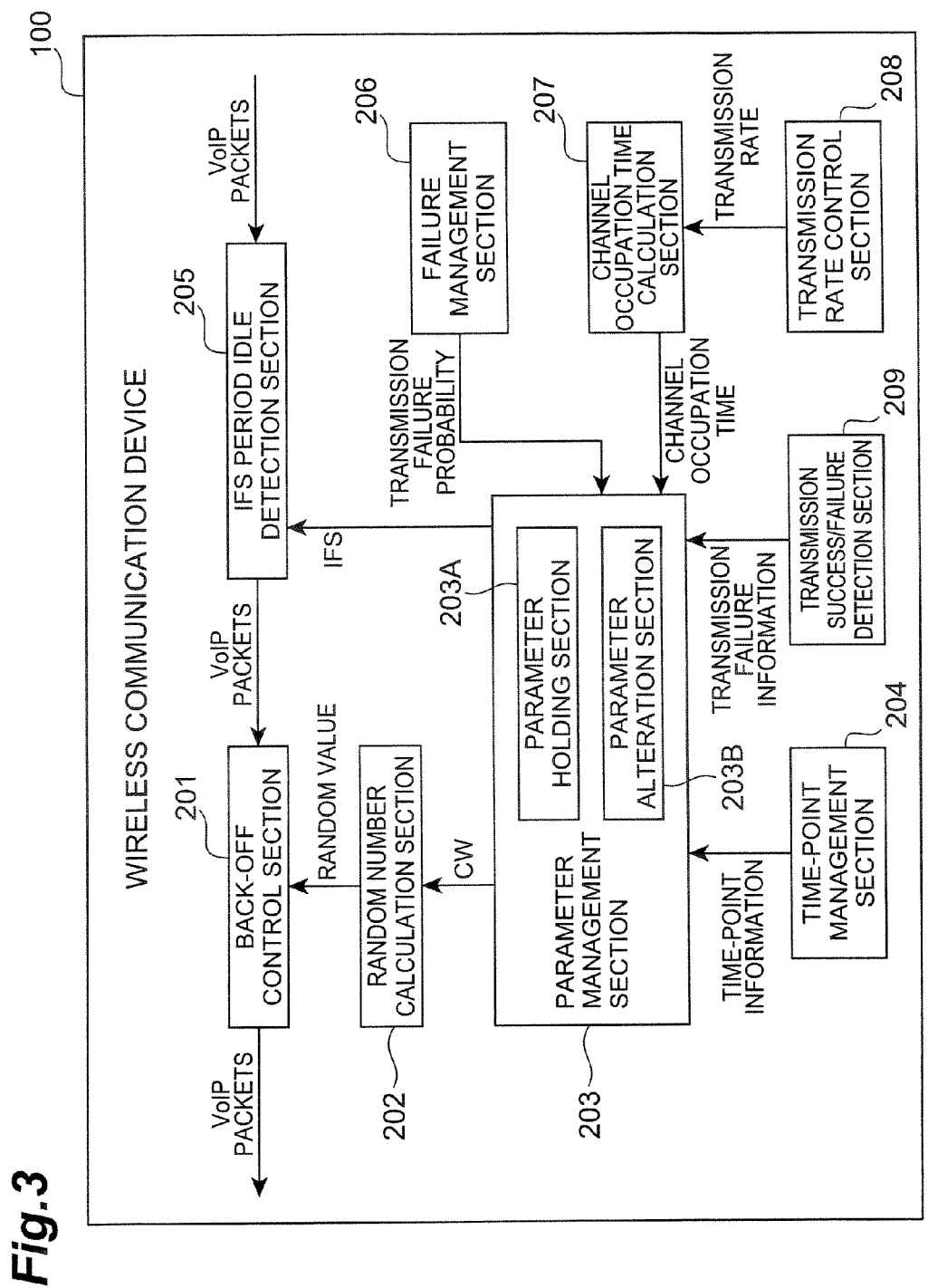
FIG. 3 is a function block layout diagram of a wireless communication device.

The hardware layout of VoIP terminals A, B, C (hereinbelow referred to in common as "wireless communication devices 100") in which communication unit according to IEEE802.11b and according to the present invention are implemented is shown in FIG. 2 and a functional block layout diagram thereof is shown in FIG. 3, respectively. The VoIP CODEC period of the wireless communication devices 100 is 40 milli second (hereinafter described "ms") in each case. The wireless communication devices 100 shown in FIG. 2 comprise as their hardware construction a CPU 101, a ROM 102, a RAM 103, a console (key buttons etc) 104, a wireless communication section 105 capable of wireless communication using CSMA/CA, and a display 106.

Also, the wireless communication devices 100 shown in FIG. 3 comprise, as their functional block layout, a back-off control section 201, a random number calculation section 202, a parameter management section 203, a time-point management section 204, an IFS period idle detection section 205, a failure management section 206, a channel occupation time calculation section 207, a transfer rate control section 208, and a transmission success/failure detection section 209. The various functional blocks are described below.

The back-off control section 201 is a back-off control section for obtaining transmission right that is mounted in the wireless communication section 105 of FIG. 2 and, if the random period wireless space is idle, VoIP packets are sent to a transmission section (not shown) that transmits these packets. The random number calculation section 202 is implemented in the wireless communication section 105 of FIG. 2 and has a function of calculating a random value in a range from 0 to CW using CW that is obtained from the parameter management section 203.

The parameter management section 203 is implemented by the CPU 101, ROM 102 and RAM 103 of FIG. 2. This parameter management section 203 comprises a parameter holding section 203A that holds, in association with a time-point, the parameter (for example IFS and CW) relating to packet transmission right acquisition priority that changes with a different distribution between wireless communication devices located in the same wireless LAN area, in a prescribed period; and a parameter alteration section 203B that reads, from the parameter holding section 203A, the parameter associated with current time-point information that is output by the time-point management section 204 and dynamically alters the current parameter in accordance with the parameter thus read. This parameter holding section 203A is implemented by the ROM (for example EEPROM capable of addition/alteration/deletion of the storage contents) 102 of FIG. 2, and the parameter alteration section 203B is implemented by the CPU 101 and RAM 103.

The time-point management section 204 is a timer that is implemented by the wireless communication section 105 of FIG. 2. The IFS period idle detection section 205 is implemented by the wireless communication section 105 of FIG. 2 and performs carrier sensing, and has a function of identifying whether or not a wireless space consecutive with the IFS period obtained by the parameter management section 203 is idle. The failure management section 206 is implemented by the ROM 102, RAM 103 and wireless communication section 105 of FIG. 2: it has the function of managing failure history of the wireless communication device 100 involving failure of packet transmission due to packet collision or failure of transmission right acquisition due to back-off. In addition, the failure management section 206 has a function of calculating the transmission failure probability using the failure history, and sending the transmission failure probability information to the parameter management section 203.

The channel occupation time calculation section 207 is implemented by the wireless communication section 105 of FIG. 2 and has a function of calculating a time (i.e. channel occupation time) necessary for transmission and reception of packets using the packet length and the transmission rate obtained by the transmission rate control section 208 and a function of sending to the parameter management section 203 the channel occupation time thus calculated. The transmission rate control section 208 is implemented by the wireless communication section 105 of FIG. 2 and manages the value of the transmission rate that is currently used by the wireless communication device 100. The transmission success/failure detection section 209 has a function of ascertaining whether transmission has succeeded or failed, and, in the case of failure, of sending transmission failure information to the parameter management section 203.

Figure 4:
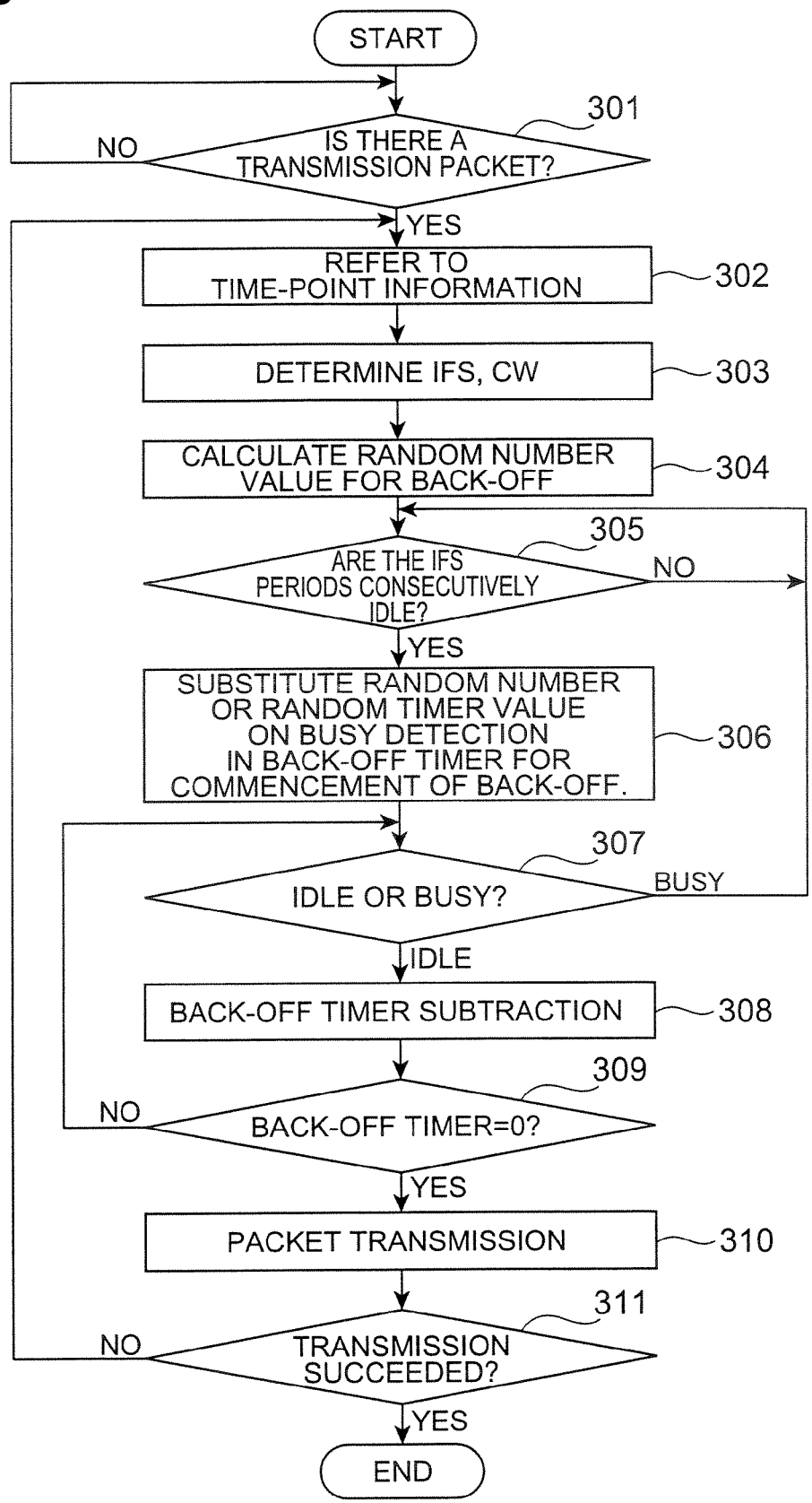
FIG. 4 is a flow chart showing packet transmission processing performed according to the present invention.

FIG. 4 is a flow chart of packet transmission processing executed by a wireless communication device 100 to which the present invention has been applied. The packet transmission processing executed by a given wireless communication device 100 (for example VoIP terminal A) is described below with reference to FIG. 4. First of all, in step 301, it is ascertained whether or not packets to be transmitted having periodicity are present. If it is then found that packets to be transmitted are present, in step 302, the time-point management section 204 refers to the current time-point information and sends the current time-point information to the parameter management section 203.

Next, in step 303, the parameter management section 203 determines the parameters such as IFS or CW corresponding to the current time-point. For example, with regard to the VoIP terminal A, the table at the top in FIG. 12 is referenced, so if the time-point at which transmission of packets with a given period is attempted is from 0 ms to 2.5 ms, IFS=10 µs and CWmin=3; if the time-point at which transmission of packets with a given period is attempted is from 2.5 ms to 40 ms, IFS=40 µs and CWmin=15. Next, in step 304, the random number calculation section 202 calculates a random number value for back-off using CWmin.

Then, in step 305, the IFS period idle detection section 205 ascertains whether or not the wireless space consecutive with the IFS period is idle. If carrier sensing shows a busy condition before becoming idle consecutive with the IFS period, the IFS period idle detection section 205 again waits for an idle condition to be produced, before detecting the period for which the idle condition is produced consecutive with the IFS period. On the other hand, if in step 305 an idle condition is detected consecutive with the IFS period, the back-off control section 201 commences back-off, using the random number value obtained in step 304 as the initial value of the back-off timer.

Continuing after this, if an idle condition is found in step 307, the back-off control section 201 decrements the back-off timer with lapse of time (step 308), and steps 307 to 309 are repeated until it is found that the back-off timer value has become 0 (i.e. until a positive result is obtained in step 309). However, if, during this process, a busy condition is detected (step 307), processing returns to step 305 while holding the back-off timer value at this time-point, and the IFS period idle detection section 205 again performs detection of an idle condition consecutive with the IFS period. In this case, the back-off control section 201 recommences back-off from the back-off timer value when a busy condition is detected in the back-off step 306.

When the back-off timer value subsequently becomes 0 (when there is a positive result in step 309), the back-off control section 201, in step 310, sends the actually transmitted packet to the packet transmission section (not shown), so that packet transmission is performed by the packet transmission section.

After this, in step 311, the transmission success/failure detection section 209 terminates the series of transmission processes if it finds that packet transmission has succeeded. However, if, in step 311, it finds that transmission has failed, retransmission is performed, but, on this occasion, the transmission success/failure detection section 209 reports the transmission failure information to the parameter management section 203. At this point, processing returns to step 302 and the time-point management section 204 sends the current time-point information to the parameter management section 203; in step 303, the parameter management section 203 re-determines the IFS and CW to be used for retransmission, on the basis of the current time-point information that is reported thereto and the transmission failure information that is reported thereto by the transmission success/failure detection section 209, and attempts packet transmission by the same procedure as described above.

In this embodiment, the packet transmission right priority acquisition distributions of the respective VoIP terminals A to C are set in accordance with the VoIP CODEC period. If this transmission right acquisition priority distribution function is assumed to be f(t) (0≦t<40), f(t) may be the reciprocal of IFS, which is a parameter relating to the transmission waiting time, or the reciprocal of CW. In this case, if the starting time-point of a given single period is assumed to be 0 ms, and the end time-point of the single period is assumed to be 40 ms, IFS and CW of each VoIP terminal are as shown in FIG. 12. By such dynamic parameter alteration, packet transmission right acquisition periods are allocated in prioritized fashion to each VoIP terminal and it is thereby made possible to suppress packet collision with other VoIP terminals. By reducing the value of the f(t) of all of the VoIP terminals A, B, C the data terminal D also becomes able to acquire a transmission right during the period from time 5.1 ms to 40 ms. The transmission right acquisition priority distribution function f(t) in this embodiment is repeated with a period of 40 ms, which is the period of the VoIP CODEC. It is therefore sufficient to define f(t) in 0≦t<40. It should be noted that the values in the Table are merely given by way of example and any suitable value could be employed for these values.

Figure 5:
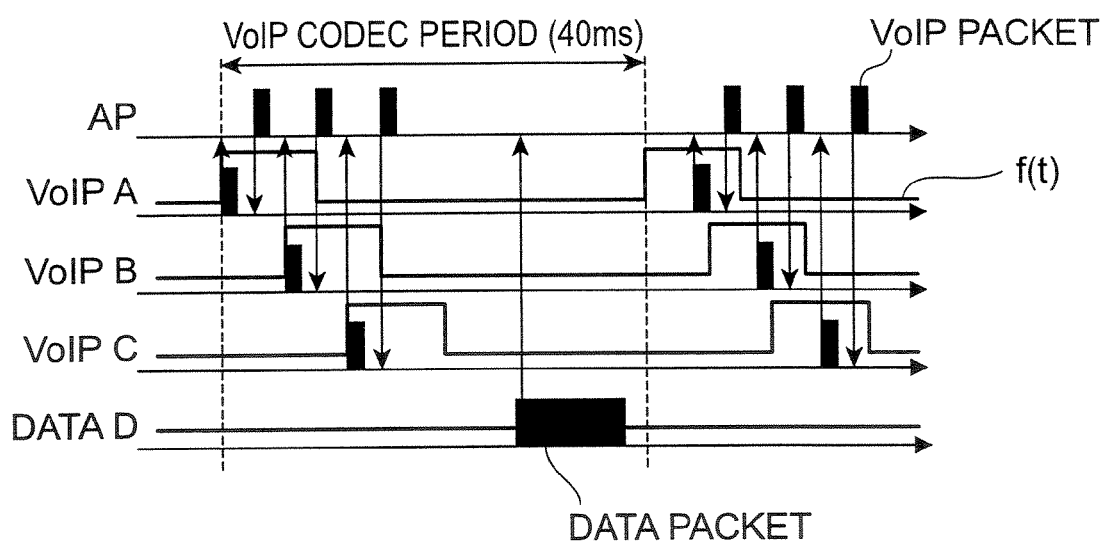
FIG. 5 is a time chart showing the transmission right acquisition condition of each VoIP terminal when transmission right acquisition priority times are set at different time-points for each of the VoIP terminals in accordance with the packet generation period.

In this way, smooth transmission and reception in which packet collision is suppressed as shown in FIG. 5 can be achieved by setting the transmission right acquisition priority time of different time-points for each VoIP terminal in accordance with the packet generation period, in other words in accordance with the VoIP CODEC period.

Further improvements relating to the above embodiments are described below in order.

Figure 6:
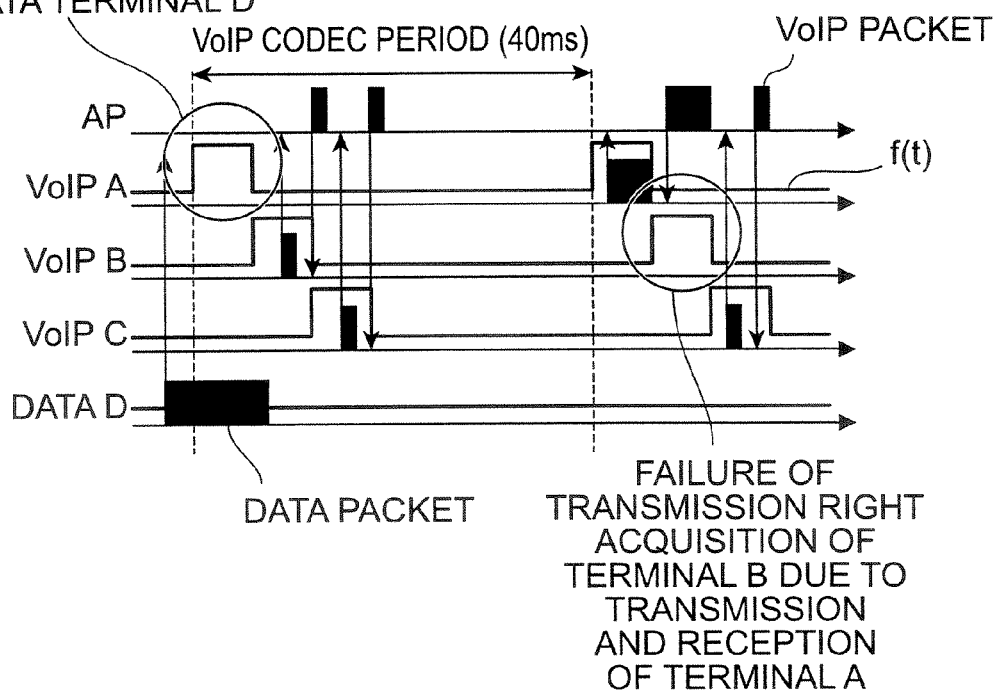
FIG. 6 is a time chart showing the transmission right acquisition condition of each VoIP terminal when the transmission right acquisition priority times of each VoIP terminal are allocated no more than the calculated channel occupation time if transmission and reception are performed with the maximum transmission rate.

It is also possible for the parameter management section 203 to set a larger value than the transmission and reception channel occupation time calculated by the maximum transmission rate, as the transmission right acquisition priority time of each VoIP terminal. For example transmission and reception including an up and down Ack take an average of 1.22 ms for a VoIP packet of size 396 byte with a transmission rate of 11 Mbps and CWmin=7 in terminals implementing IEEE802.11b and 802.11e EDCA. However, the following advantages are obtained by setting the transmission right acquisition priority time to a value larger than the transmission and reception channel occupation time (2.5 ms) calculated by the maximum transmission rate. If, as the transmission right acquisition priority time of each VoIP terminal, only the calculated channel occupation time for the case where transmission and reception take place at a maximum rate is to be allocated, as shown in FIG. 6, the transmission and reception period of the data terminal D would interrupt the transmission right acquisition priority time of the VoIP terminal A, leading to the possibility of failure of the VoIP terminal A to acquire a transmission right in the transmission right acquisition priority time. Also, if, as shown in FIG. 6, the transmission rate of a given VoIP terminal A is dropped, this would result in the possibility of failure of the following VoIP terminal B to acquire a transmission right in the transmission right acquisition priority time. Consequently, the transmission right acquisition priority time of the VoIP terminals must be set to be greater than the transmission and reception channel occupation time calculated by the maximum transmission rate, so as to make it possible to solve the problem shown in FIG. 6. It should be noted that the transmission right acquisition priority time of the VoIP terminals is of course set to a value no more than the packet generation period.

Figure 7:
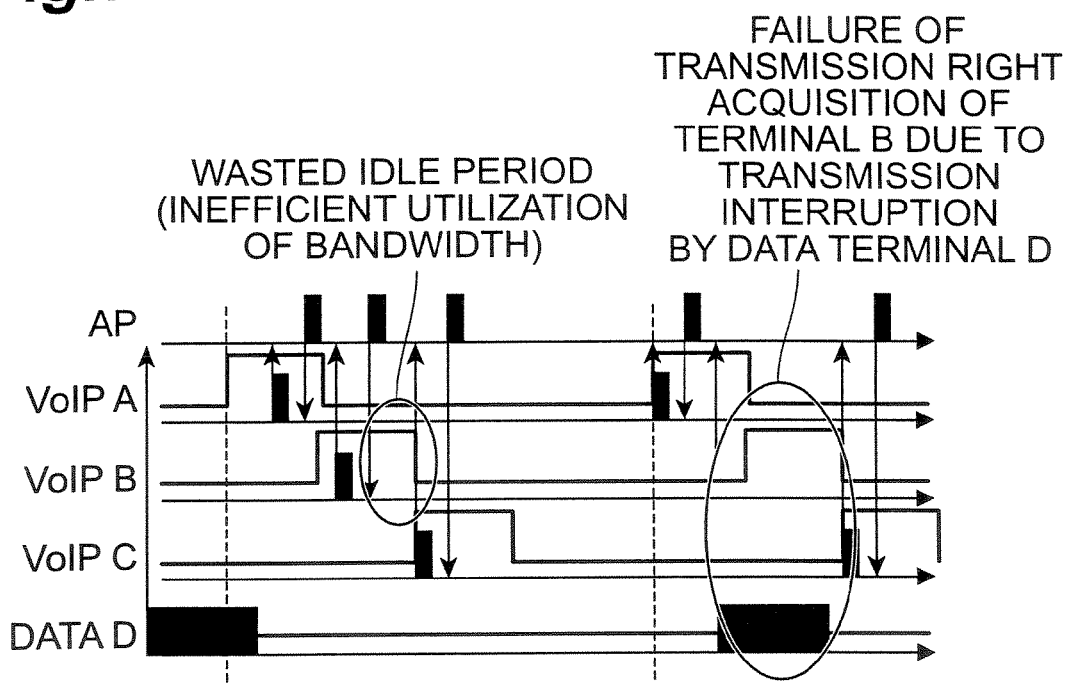
FIG. 7 is a time chart showing the transmission right acquisition condition of each VoIP terminal when the transmission right acquisition priority times are allocated such that no overlapping of the VoIP terminals takes place.
Figure 8:
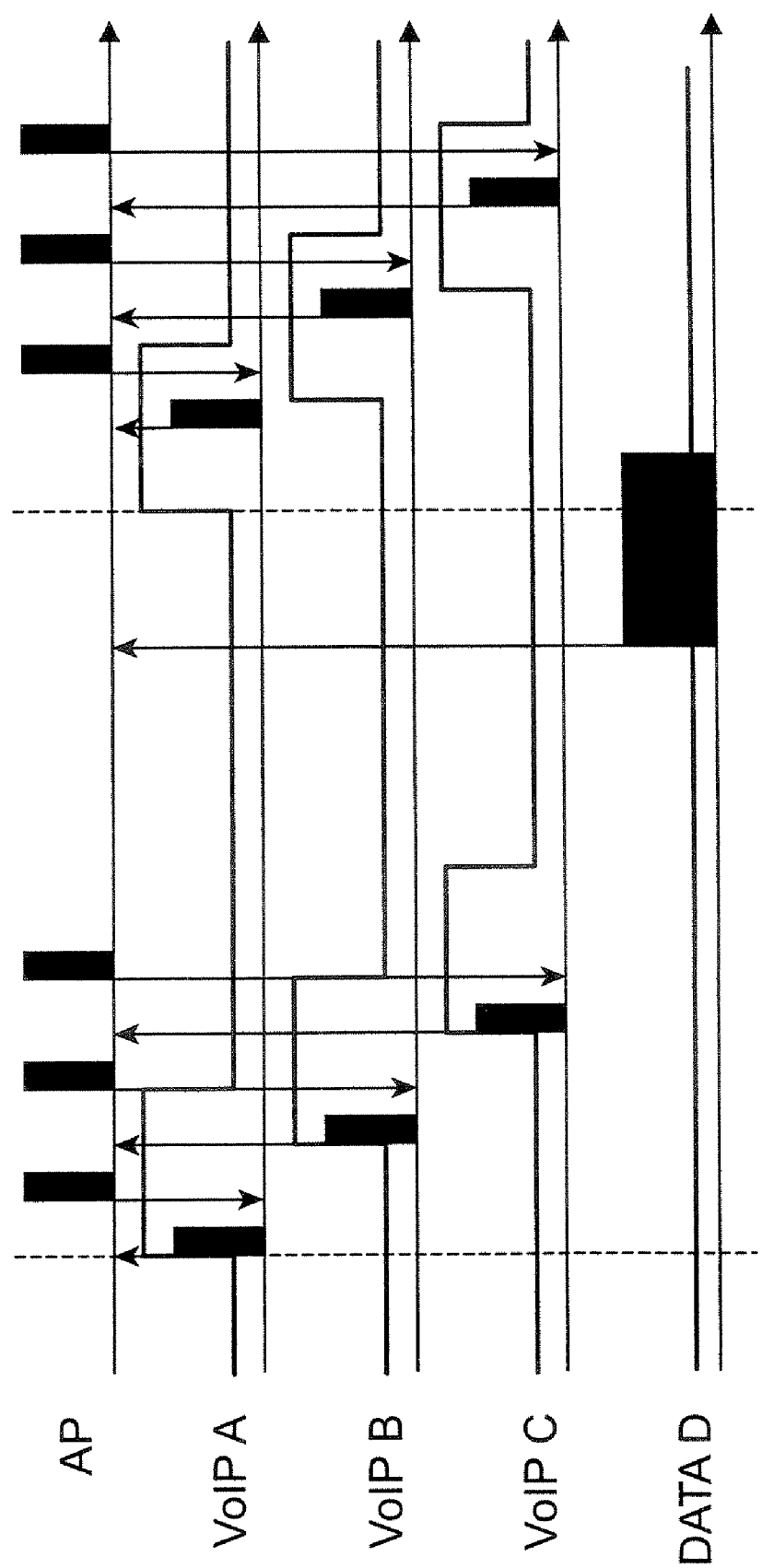
FIG. 8 is a time chart showing the transmission right acquisition condition of each VoIP terminal when the transmission right acquisition priority times of each VoIP terminal are allocated such that there is partial overlap with the transmission right acquisition priority times of other VoIP terminals.

Also, the parameter management section 203 may set the packet transmission right acquisition priority time of its own wireless communication device such that the packet transmission right acquisition priority time of its own wireless communication device partially overlaps the packet transmission right acquisition priority time of another wireless communication device in the same wireless LAN area. If, as shown in FIG. 7, the transmission right acquisition priority time is to be allocated so as not to overlap with any of the VoIP terminals, a time band would be generated in the transmission right priority acquisition period of the VoIP terminals A, B and C in which no VoIP terminal is performing transmission or reception i.e. the channel (bandwidth) would be inefficiently utilized. Also, immediately after completion of transmission and reception of the VoIP terminal A, transmission interruption by the data terminal D would occur, resulting in the situation of the VoIP terminal B being unable to acquire a transmission right in the transmission right acquisition priority time. Consequently, by allocating a transmission acquisition priority time of the VoIP terminals such as to partially overlap with the transmission right acquisition priority time of another VoIP terminal as in FIG. 8, inefficient utilization of the channel (bandwidth) is avoided, and it is possible to avoid the situation of interruption of transmission and reception by a wireless device (data terminal D) that is not implementing the construction according to the present invention of the transmission right acquisition priority time allocated to a wireless communication device (VoIP terminal B) according to the present invention.

Also, in a prescribed period, the parameter values such as of IFS and CW at the starting time-point of the transmission right acquisition priority time may be temporarily set to smaller values, these values being held until the time-point of termination of this period. For example, the parameter tables of the VoIP terminals A, B, and C may be respectively set as shown in FIG. 13. In this way, implementation is facilitated and it also becomes possible to acquire the transmission right in the order: VoIP terminals A, B, C.

Figure 9:
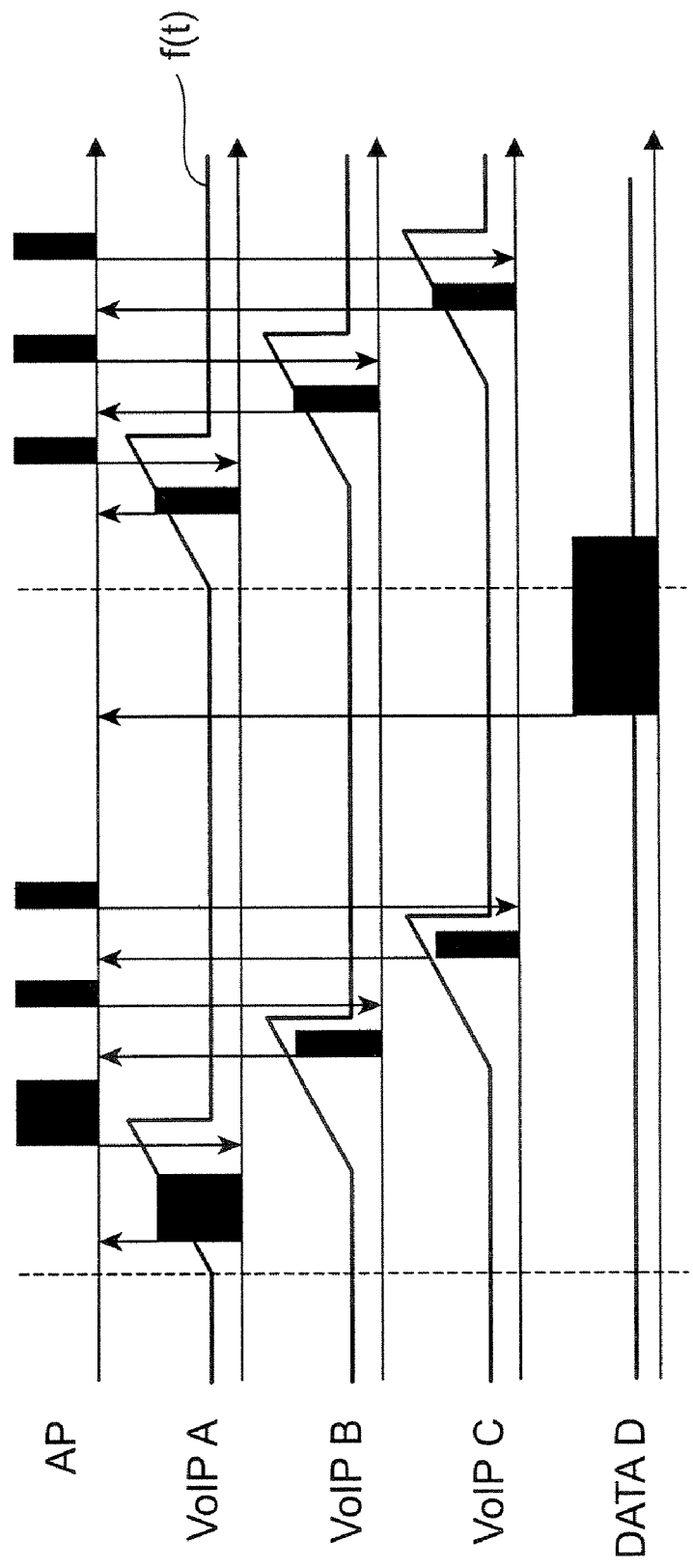
FIG. 9 is a time chart showing the transmission right acquisition condition of each VoIP terminal when the maximum value of the distribution function of packet transmission right acquisition priority time is after an intermediate time-point.

Next, a transmission right acquisition priority distribution function f(t) that is desirable for smooth communication managed by the parameter management section 203 will be described. In this example of the VoIP terminals, f(t) is assumed to be a step function as one example given by way of explanation, but any suitable distribution could be employed. In particular, although a step function has the advantage of ease of implementation, since the values of the f(t) of the VoIP terminal A and VoIP terminal B in the period from time-point 1.3 ms to 2.5 ms in this example are equal, there is a high likelihood of transmission packet collision of the VoIP terminal A and VoIP terminal B. Furthermore, since, in the case of a function distribution such as a Gaussian function distribution or ramp function distribution, the value of f(t) in the priority time is never fixed, equality of the values of f(t) of the VoIP terminals A, B during the period from 1.3 ms to 2.5 ms can only occur instantaneously, so packet collision can be suppressed. By way of example, the parameters in a single period of the VoIP terminal A in the case where a ramp function is employed are shown in FIG. 14 and f(t) in the case where all of the VoIP terminals employ ramp functions is shown in FIG. 9, respectively. The parameter management section 203 may either be constructed so as to hold in the form of a parameter table parameter values in the priority time calculated beforehand so as to simulate a ramp function, as in FIG. 14, or may be constructed such that only the calculation expression of a ramp function is held, and specific values are found by calculation every time there is a transmission request.

Figure 10:
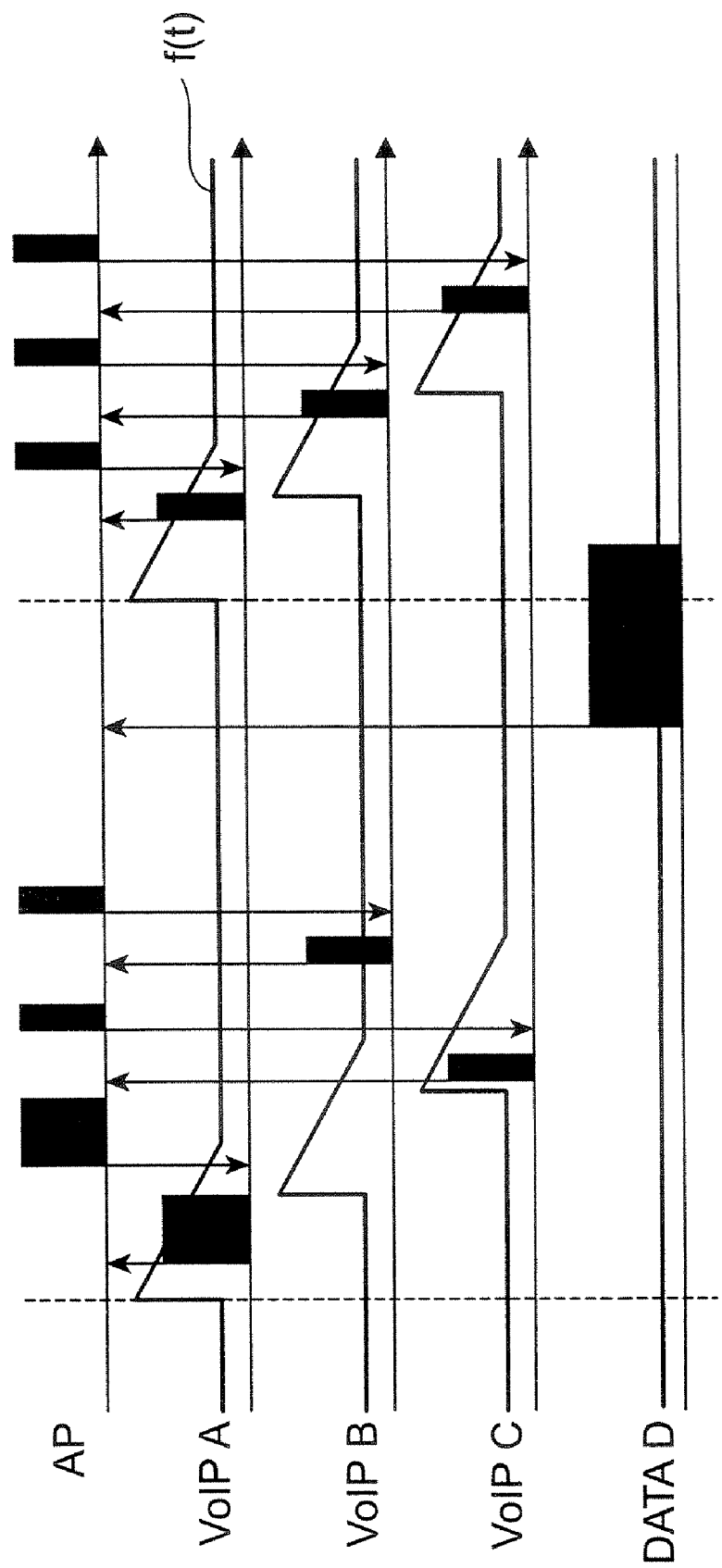
FIG. 10 is a time chart showing the transmission right acquisition condition of each VoIP terminal when the maximum value of the distribution function of packet transmission right acquisition priority time is before the intermediate time-point.

Also, the following advantages are obtained if the maximum value of f(t) is before the determination time-point of the transmission right acquisition priority time and after the intermediate time-point of the transmission right acquisition priority time. If the maximum value of f(t) is to be after the starting time-point of the transmission right acquisition priority time and before the intermediate time-point of the transmission right acquisition priority time, as in FIG. 10, there would be a possibility of the transmission right acquisition priority time of the VoIP terminal A being interrupted by the transmission and reception period of the data terminal D: the result would be that there would be little benefit even in conferring a large priority right at the starting time-point of the priority time. Also, if the maximum value of f(t) is to be after the starting time-point of the transmission right acquisition priority time and before the intermediate time-point of the transmission right acquisition priority time at the VoIP terminal B, the transmission and reception channel occupation time of the VoIP terminal A would interrupt the transmission right acquisition priority time of the VoIP terminal B: the result would be that there would be little benefit even in conferring a large priority right at the starting time-point of the priority time. In addition, as shown in FIG. 10, there would also be a possibility that the VoIP terminal C might acquire the transmission right before transmission by the VoIP terminal B, with the result that the VoIP terminal B would be unable to acquire a transmission right within the priority time of its home base station. In contrast, as in FIG. 9, the probability of acquisition of a transmission right within the priority time is increased by providing a larger priority right in the latter half of the transmission right acquisition priority time, since the probability of interruption of the transmission and reception occupation time of another VoIP terminal in this latter half of the transmission right acquisition priority time is small.

Also, the value and variance of the transmission right acquisition priority distribution function f(t) may be different for each VoIP terminal and/or may be dynamically altered. The value of f(t) corresponds to the reciprocal of the IFS or CWmin parameter value in this example, and the variance corresponds to the length of the priority time. If packet transmission failures occur repeatedly, the transmission failure probability is reported to the parameter management section 203 by the failure management section 206 that holds the transmission failure history. If the probability of transmission failure in the transmission right acquisition priority time of its home base station becomes greater than a threshold value, the parameter management section 203 may increase the transmission right acquisition probability by increasing the value, or variance, of the transmission right acquisition priority distribution function f(t).

Figure 11:
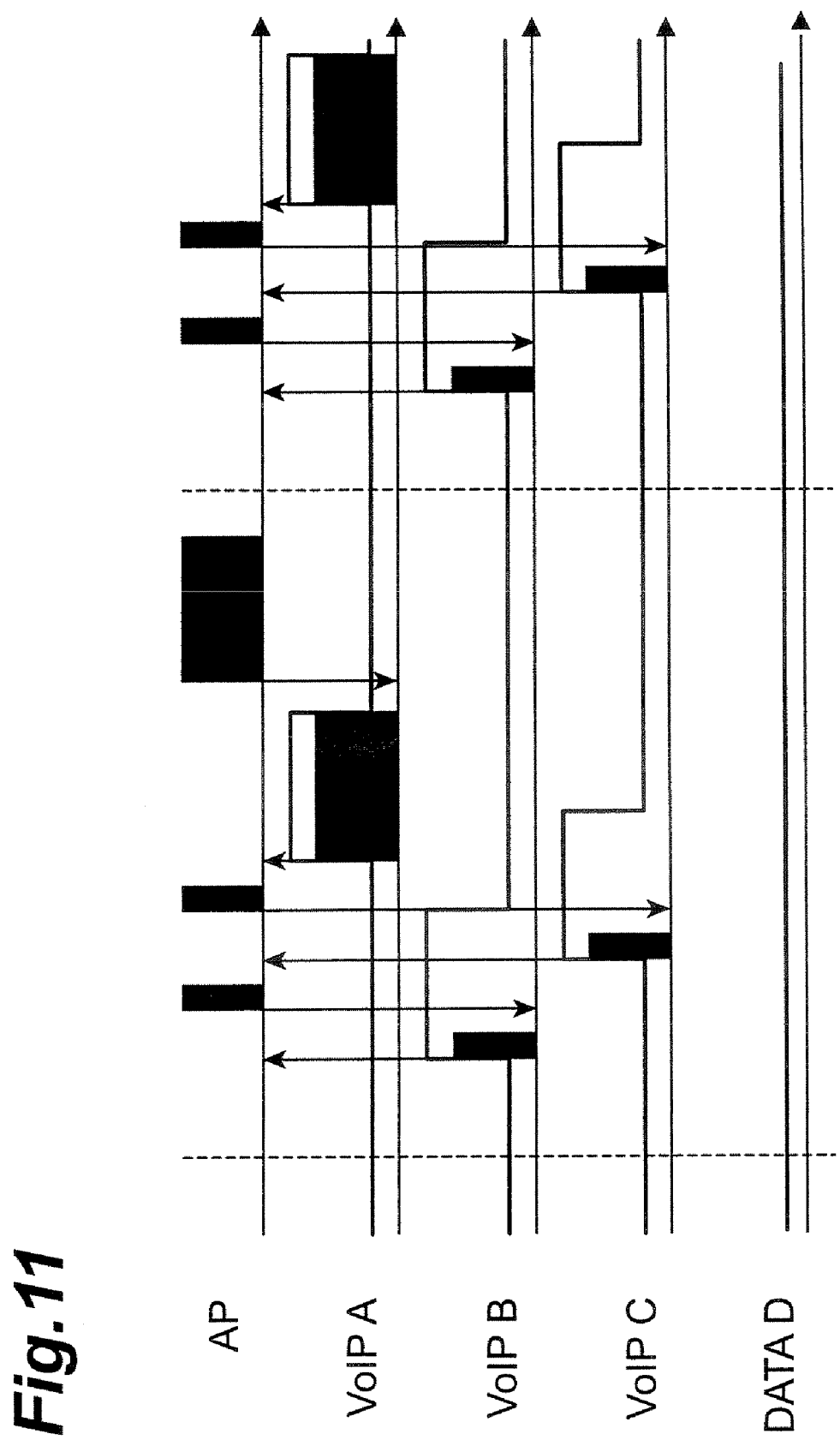
FIG. 11 is a time chart showing the transmission right acquisition condition of each VoIP terminal when the packet transmission right acquisition priority time of a given terminal is set to the last in the case where another VoIP terminal becomes unable to acquire a transmission right within the packet transmission right acquisition priority time.

Also, a method of setting the effective transmission right acquisition priority time in the case where, with lowering of the transmission rate, the transmission and reception occupation period is increased to such extent that another VoIP terminal cannot obtain a transmission right in the transmission right acquisition priority period will be described. In this embodiment, when the transmission rate of the VoIP terminal A is low, so that the scheduled time-point for completion of transmission and reception by the VoIP terminal A is later than 3.8 ms, there is a possibility of failure of transmission right acquisition by the VoIP terminals B and C in the transmission right priority acquisition period of the respective VoIP terminals. In this case, the channel occupation time calculation section 207 therefore reports the result of the channel occupation time calculation to the parameter management section 203, and the parameter management section 203 sets the transmission right acquisition priority time of the VoIP terminal A to be right at the end of the series of priority times. For example, the parameter table that is held by the parameter management section 203 of the VoIP terminal A is altered as shown in FIG. 15. Function f(t) in this case and the associated transmission and reception sequence are shown in FIG. 11. In this way, the situation that transmission priority acquisition by the VoIP terminals B and C may fail due to channel occupation associated with transmission and reception by the VoIP terminal A can be avoided.

Next, a retransmission sequence in the technique according to the present invention will be described. For retransmission, in the case of the standard technique of IEEE802.11, the CW size is doubled every time retransmission is performed, but, with the present technique, the respective CW sizes of the VoIP terminals A, B, C are altered in accordance with the values of CWmin shown in the first to third tables from the top in FIG. 12 in the transmission right acquisition priority period irrespective of whether the transmission is the first transmission or a retransmission. This is because, if the size of the CW is doubled as in the standard technique in the transmission right acquisition priority time of the home base station, the transmission right acquisition priority is decreased. On the other hand, in the time range 5.1 ms to 40 ms in this example, it would be possible to double the CW size every time retransmission is performed, as in the standard technique.

Retransmission by a VoIP terminal that has failed to acquire a transmission right in the transmission right acquisition priority time of the home base station or by a VoIP terminal that has acquired a transmission right but whose transmission is unsuccessful due to packet collision may be attempted in the period in which no transmission right acquisition priority time has been conferred on any VoIP terminal (for example period from the time-point 5.1 ms to the time-point 40 ms). Although delay of packet transmission/reception occurs if transmission succeeds in this period, packet loss can be avoided.

Also, even in the case of an application that generates packets periodically, in some periods, packets may not be generated. For example, in a VoIP terminal in which silent interval detection is installed, VoIP packets to be transmitted are not generated in the silent interval. In this embodiment, it is assumed that, in a given period, the VoIP terminal B has no packets to be transmitted in the transmission right priority acquisition period of the home base station, so there has been no packet transmission. In this case, another VoIP terminal may transmit. The reason for this is that, with the present technique, acquisition of a transmission right is possible by normal back-off, even at a time-point outside the priority time. Consequently, even if for example a given VoIP terminal has not transmitted in the transmission right priority acquisition period of its home base station, it is not the case that this priority period must always consist of wasted idle slots: thus effective bandwidth utilization can be achieved.

Furthermore, in the case of a multi-cell environment in which a plurality of base stations are provided, even in overlapping regions with neighboring cells using the same or adjacent frequency channels, since the VoIP terminals determine their transmission timing autonomously in accordance with the back-off control system, the severe degradation of quality resulting from the successive collisions of polling emanating from base stations, such as occurs in the case of HCCA, can be avoided.

Finally, the beneficial effects of this embodiment will be described. According to this embodiment, in a packet transmission system wherein wireless bandwidth allocation is performed by virtual carrier sensing, a parameter management section 203 comprises a parameter holding section 203A that holds a parameter that changes with a different distribution between wireless communication devices in a prescribed period and, in addition, the parameter associated with the current time-point is read from a parameter table that is held in this parameter holding section 203A and a parameter relating to the packet transmission right acquisition priority is actively altered in response to this parameter. In this way, when packets to be transmitted are held by a plurality of VoIP terminals, packet transmission from each of the VoIP terminals takes place with different timing from the other VoIP terminals, so smooth communication can be achieved in which the probability of packet collision is lowered.

Also, if the probability of transmission failure that is reported from the failure management section 206 is a given a threshold value or more, the parameter management section 203 reduces the parameter such as for example IFS or CW, in the transmission right acquisition priority time, or increases the probability of packet transmission success by increasing the transmission right acquisition priority time, such as thereby to make possible smooth communication.

In addition, the channel occupation time calculation section 207, by using the transmission rate that is reported thereto by the transmission rate control section 208 and the transmission packet size, calculates the channel occupation time prior to transmission and reports this to the parameter management section 203, and the packet management section 203 creates a parameter table of for example the IFS or CW such as to set the transmission right acquisition priority time of its home base station as a transmission right acquisition priority time in the latter part of the series of priority times, if the channel occupation time that would result from transmission and reception by the home base station is so large that other VoIP terminals would not be able to obtain a transmission right in the transmission right acquisition priority time. In this way, the probability of failure of other VoIP terminals to acquire a transmission right within the transmission right acquisition priority time due to channel occupation by any of the VoIP terminals A, B, C can be reduced, making possible smooth communication.

The disclosure of Japanese Patent Application No. 2006-031395 filed Feb. 8, 2006 including specification, drawings and claims is incorporated herein by reference in its entirety.

What is claimed is:

1. A wireless communication device configured to perform packet transmission in accordance with a packet transmission system that performs wireless bandwidth allocation by virtual carrier sensing, comprising:
    a time-point management module configured to output current time-point information, the current time-point information corresponding to a current time-point within a prescribed transmission period;
    a parameter management module configured to manage a parameter relating to packet transmission right acquisition priority describing the priority of the wireless communication device to acquire a right for packet transmission, during a packet transmission right acquisition priority time which is the time during which the wireless communication device has the packet transmission right acquisition priority, of the wireless communication device,
    wherein said parameter management module comprises:
        a parameter holding module configured to hold, in association with a time-point, the parameter relating to the packet transmission right acquisition priority that changes with a different distribution between wireless communication devices located in the same wireless LAN area, in the prescribed transmission period; and
        a parameter alteration module configured to read, from said parameter holding module, said parameter associated with the current time-point information that is output by said time-point management module and to dynamically alter a current parameter relating to the packet transmission right acquisition priority in accordance with the parameter thus read;
    a random number calculation section configured to calculate a random value for a back-off period based on the altered current parameter relating to the packet transmission right acquisition priority; and
    a packet transmission section configured to perform the packet transmission over a communication channel, after the calculated random value for the back-off period has elapsed during an idle period of the communication channel.

2. The wireless communication device according to claim 1, further comprising:
    a transmission rate control module configured to manage the transmission rate used by this wireless communication device itself and to output maximum transfer rate information; and
    a channel occupation time calculation module configured to calculate the channel occupation time corresponding to the time required for packet transmission and reception, based on the maximum transmission rate information that is output by said transmission rate control module and transmission packet size,
    wherein said parameter management module is configured to set the packet transmission right acquisition priority time of this wireless communication device itself to a value longer than the channel occupation time calculated by said channel occupation time calculation module.

3. The wireless communication device according to claim 1,
    wherein said parameter management module is configured to set the packet transmission right acquisition priority time of this wireless communication device itself such that the packet transmission right acquisition priority time of this wireless communication device itself partially overlaps with a packet transmission right acquisition priority time of another wireless communication device in the same wireless LAN area.

4. The wireless communication device according to claim 1,
    wherein said parameter management module is configured to manage said parameter by employing, as a distribution function of the packet transmission right acquisition priority in the packet transmission right acquisition priority time, a function in which the maximum value of the packet transmission right acquisition priority occurs subsequent to an intermediate time-point of the packet transmission right acquisition priority time and before a termination time-point thereof.

5. The wireless communication device according to claim 1, wherein said parameter management module is configured to manage said parameter by employing a step function as a distribution function of the packet transmission right acquisition priority in the packet transmission right acquisition priority time.

6. The wireless communication device according to claim 1, further comprising:
a failure management module configured to manage and output at least one of a transmission failure probability based on a transmission failure history in the packet transmission right acquisition priority time and a transmission right acquisition failure probability based on a transmission right acquisition failure history,
wherein, when at least one of the transmission failure probability and transmission right acquisition failure probability output by said failure management module is a prescribed threshold value or more, said parameter management module is configured to increase the value of the packet transmission right acquisition priority in the packet transmission right acquisition priority time or a variance of this value.

7. The wireless communication device according to claim 1,
wherein said parameter management module is configured to use a Contention Window in accordance with a prescribed distribution function in the packet transmission right acquisition priority time, not only on an initial transmission, but also on re-transmitting, so long as this is within the packet transmission right acquisition priority time.

8. The wireless communication device according to claim 1,
wherein said parameter management module is configured to set the packet transmission right acquisition priority time such that the packet transmission right acquisition priority time of a wireless communication device whose channel occupation time has been increased to such an extent as to impede transmission right acquisition by another wireless communication device among a plurality of wireless communication devices located within the same wireless LAN area, is last in terms of time among packet transmission right acquisition priority times of said plurality of wireless communication devices.

9. A wireless communication method in a wireless communication device provided with parameter holding module that holds, in association with a time-point, a parameter relating to packet transmission right acquisition priority describing the priority of the wireless communication device to acquire a right for packet transmission that changes with a different distribution between wireless communication devices located in the same wireless LAN area, in a prescribed transmission period,
the wireless communication method being a method for performing packet transmission in accordance with a packet transmission system that performs wireless bandwidth allocation by virtual carrier sensing,
the wireless communication method comprising:
ascertaining, by the wireless communication device, a current time-point information, the current time-point information corresponding to a current time-point within the prescribed transmission period;
reading, by the wireless communication device, the parameter relating to the packet transmission right acquisition priority, during a packet transmission right acquisition priority time which is the time during which the wireless communication device has the packet transmission right acquisition priority, of the wireless communication device associated with the current time-point information, from said parameter holding module;
dynamically altering, by the wireless communication device, a current parameter relating to the packet transmission right acquisition priority, in accordance with the parameter thus read;
calculating a random value for a back-off period based on the altered current parameter relating to the packet transmission right acquisition priority; and
performing the packet transmission over a communication channel, after the calculated random value for the back-off period has elapsed during an idle condition of the communication channel.

10. The wireless communication device according to claim 1, further comprising:
a back-off control section configured to commence back-off using the calculated random value as an initial value of a back-off timer, and to decrement the back-off timer if a wireless space is idle.

11. The wireless communication method according to claim 9, further comprising:
commencing back-off using the calculated random value as an initial value of a back-off timer, and
decrementing the back-off timer if a wireless space is idle.

* * * * *